United States Patent
Xu et al.

(10) Patent No.: US 11,757,704 B2
(45) Date of Patent: Sep. 12, 2023

(54) METHOD FOR HANDLING RADIO LINK FAILURE, TERMINAL DEVICE, AND NETWORK DEVICE

(71) Applicant: Huawei Technologies Co., Ltd., Shenzhen (CN)

(72) Inventors: Bin Xu, Beijing (CN); Bingzhao Li, Beijing (CN); Li Chai, Shenzhen (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/716,312

(22) Filed: Dec. 16, 2019

(65) Prior Publication Data

US 2020/0119976 A1 Apr. 16, 2020

Related U.S. Application Data

(63) Continuation of application No. PCT/CN2018/091670, filed on Jun. 15, 2018.

(30) Foreign Application Priority Data

Jun. 16, 2017 (CN) .......................... 201710458408.7

(51) Int. Cl.
*H04L 41/0668* (2022.01)
*H04L 1/08* (2006.01)
(Continued)

(52) U.S. Cl.
CPC ............ *H04L 41/0668* (2013.01); *H04L 1/08* (2013.01); *H04W 24/02* (2013.01); *H04W 72/0453* (2013.01); *H04W 76/27* (2018.02)

(58) Field of Classification Search
CPC ..... H04L 41/0668; H04L 1/08; H04L 5/0044; H04W 76/27; H04W 24/02;
(Continued)

(56) References Cited

U.S. PATENT DOCUMENTS

2011/0103221 A1 5/2011 Lee et al.
2012/0142336 A1 6/2012 Van Phan et al.
(Continued)

FOREIGN PATENT DOCUMENTS

CN 101615992 A 12/2009
CN 101873717 A 10/2010
(Continued)

OTHER PUBLICATIONS

Husnu Narman et al., Primary Component Carrier Assignment in LTE-A, Quality, Reliability, Security and Robustness in Heterogeneous Networks. 12th International Conference, QShine [online], Aug. 9, 2017 [retrieved on Apr. 28, 2023], Retrieved from the Internet (Year: 2017) <URL: https://hsnarman.github.io/CONF/16-QSHINE-PCC-Asg.pdf> <DOI: 10.1007/978-3-319-60717-7_16> (Year: 2017).*

(Continued)

*Primary Examiner* — Omar J Ghowrwal
(74) *Attorney, Agent, or Firm* — Leydig, Voit & Mayer, Ltd.

(57) ABSTRACT

A method for handling a radio link failure (RLF) is described. The method includes sending, by a terminal device, duplicated data packets to a network device on a first carrier and a second carrier. Thereafter, upon determining that an RLF occurred on one of the first carrier and the second carrier, the terminal device sends RLF indication information to the network device. The RLF indication information indicates that the RLF event occurs on the first carrier, the second carrier, or the first carrier and the second carrier.

12 Claims, 5 Drawing Sheets

(51) Int. Cl.
    *H04W 24/02* (2009.01)
    *H04W 76/27* (2018.01)
    *H04W 76/15* (2018.01)
    *H04W 76/16* (2018.01)
    *H04W 76/19* (2018.01)
    *H04L 5/00* (2006.01)
    *H04W 72/0453* (2023.01)

(58) Field of Classification Search
CPC . H04W 72/0453; H04W 76/15; H04W 76/16; H04W 76/19
See application file for complete search history.

(56) References Cited

U.S. PATENT DOCUMENTS

| | | | |
|---|---|---|---|
| 2014/0233372 A1* | 8/2014 | Edmiston | H04L 41/0668 370/225 |
| 2015/0188664 A1* | 7/2015 | Glosser, Jr. | H04L 1/203 714/776 |
| 2016/0021696 A1 | 1/2016 | Chuang | |
| 2017/0171903 A1 | 6/2017 | Kubota et al. | |
| 2018/0270139 A1* | 9/2018 | Singh | H04L 12/64 |
| 2018/0310202 A1* | 10/2018 | Löhr | H04W 76/27 |

FOREIGN PATENT DOCUMENTS

| | | |
|---|---|---|
| CN | 101997662 A | 3/2011 |
| CN | 102036284 A | 4/2011 |
| CN | 102083097 A | 6/2011 |
| CN | 102448078 A | 5/2012 |
| CN | 103190169 A | 7/2013 |
| CN | 103687064 A | 3/2014 |
| CN | 107342851 A | 11/2017 |
| EP | 2416612 A1 | 2/2012 |
| RU | 2602981 C2 | 11/2016 |
| WO | 2010088329 A1 | 8/2010 |
| WO | 2011097807 A1 | 8/2011 |
| WO | 2014111499 A1 | 7/2014 |
| WO | 2014206489 A1 | 12/2014 |
| WO | WO-2017197264 A1 * | 11/2017 ........... H04L 1/1812 |

OTHER PUBLICATIONS

CATT, "RLC failure and RLF", 3GPP TSG-RAN WG2 Meeting #98, Hangzhou, China, R2-1704226, 3 pages, 3rd Generation Partnership Project, Valbonne, France (May 15-19, 2017).

"Consideration on the activation/deactivation of data duplication for CA," 3GPP TSG-RAN WG2 Meeting #98, Hangzhou, China, R2-1704660, pp. 1-3, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, pp. 1-454, 3rd Generation Partnership Project, Valbonne, France (Mar. 2017).

"Configuration and activation/deactivation of duplication," 3GPP TSG-RAN WG2 Meeting #98, Hangzhou, China, R2-1704247, pp. 1-2, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.2.1, pp. 1-106, 3rd Generation Partnership Project, Valbonne, France (Mar. 2017).

"Discussion on Packet Duplication," 3GPP TSG-RAN WG2 Meeting #98, Hangzhou, China, R2-1705727, pp. 1-3, 3rd Generation Partnership Project, Valbonne, France (May 15-19, 2017).

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.2, pp. 1-721, 3rd Generation Partnership Project, Valbonne, France (Apr. 2017).

"Email discussion summary on control of UL PDCP duplication," 3GPP TSG-RAN2#98, Hangzhou, China, R2-1704834, pp. 1-9, 3rd Generation Partnership Project, Valbonne, France (May 15-19, 2017).

"3rd Generation Partnership Project; Technical Specification Group Radio Access Network; NR; Medium Access Control (MAC) protocol specification (Release 15)," 3GPP TS 38.321 V0.0.3, pp. 1-21, 3rd Generation Partnership Project, Valbonne, France (May 15-19, 2017).

"Activation and Deactivation of UL PDCP duplication," 3GPP TSG-RAN WG2 #98, Hangzhou, China, R2-1705266, pp. 1-3, 3rd Generation Partnership Project, Valbonne, France (May 15-19, 2017).

"3rd Generation Partnership Project; Technical Specification Group Radio Access Network; NR; Radio Link Control (RLC) protocol specification (Release 15)," 3GPP TS 38.322 V0.0.2, pp. 1-18, 3rd Generation Partnership Project, Valbonne, France (May 2017).

"Enable/Disable PDCP Duplication," 3GPP TSG-RAN2 Meeting #98, Hangzhou, China, R2-1704941, pp. 1-2, 3rd Generation Partnership Project, Valbonne, France (May 15-19, 2017).

"3rd Generation Partnership Project; Technical Specification Group Radio Access Network; NR; Packet Data Convergence Protocol (PDCP) specification (Release 15)," 3GPP TS 38.323 V0.0.5, pp. 1-24, 3rd Generation Partnership Project, Valbonne, France (May 2017).

"3rd Generation Partnership Project; Technical Specification Group Radio Access Network; NR; Radio Resource Control (RRC); Protocol specification (Release 15)," 3GPP TS 38.331 V0.0.3, pp. 1-20, 3rd Generation Partnership Project, Valbonne, France (May 2017).

"3rd Generation Partnership Project; Technical Specification Group Radio Access Network; NR; NR and NG-RAN Overall Description; Stage 2 (Release 15)," 3GPP TS 38.300 V0.4.1, pp. 1-55, 3rd Generation Partnership Project, Valbonne, France (Jun. 2017).

"3rd Generation Partnership Project; Technical Specification Group Radio Access Network; Evolved Universal Terrestrial Radio Access (E-UTRA); Packet Data Convergence Protocol (PDCP) specification (Release 14)," 3GPP TS 36.323 V14.2.0, pp. 1-43, 3rd Generation Partnership Project, Valbonne, France (Mar. 2017).

Das et al., "Evaluation of Mobile Handset Recovery from Radio Link Failure in a Multi-RATs Environment," 2008 2nd International Conference on Internet Multimedia Services Architecture and Applications, total 6 pages (Dec. 10-12, 2008).

CATT, "Mapping of logical channels onto CCs in CA with duplication," 3GPP TSG-RAN WG2 Meeting #98, Hangzhou, China, R2-1704248, total 2 pages, 3rd Generation Partnership Project, Valbonne, France (May 15-19, 2017).

Nokia, Alcatel-Lucent Shanghai Bell, "Duplication Impacts to RLC," 3GPP TSG-RAN WG2 Meeting #98, Hangzhou, China, R2-1704275, total 2 pages, 3rd Generation Partnership Project, Valbonne, France (May 15-19, 2017).

CATT, "Details on S-RLF," 3GPP TSG RAN WG2 Meeting #87, Dresden, Germany, R2-143540, total 4 pages, 3rd Generation Partnership Project, Valbonne, France (Aug. 18-22, 2014).

Huawei, HiSilicon, "RLF and PCell change for carrier aggregation in NR," 3GPP TSG-RAN WG2 Meeting #98, Hangzhou, China, R2-1704867, total 2 pages, 3rd Generation Partnership Project, Valbonne, France (May 15-19, 2017).

* cited by examiner

METHOD FOR HANDLING RADIO LINK FAILURE, TERMINAL DEVICE, AND NETWORK DEVICE

CROSS-REFERENCE TO RELATED APPLICATIONS

This application is a continuation of International Application No. PCT/CN2018/091670, filed on Jun. 15, 2018, which claims priority to Chinese Patent Application No. 201710458408.7, filed on Jun. 16, 2017. The disclosures of the aforementioned applications are hereby incorporated by reference in their entireties.

TECHNICAL FIELD

This application relates to the field of communications technologies, and more specifically, to a method for handling a radio link failure, a terminal device, and a network device.

BACKGROUND

To improve data packet transmission reliability, a solution of duplication transmission for a data packet is proposed in the industry. Specifically, a terminal device may send two duplicated data packets to a base station on two carriers. In this way, the base station can successfully receive the data packets that need to be sent by the terminal device to the base station, provided that the base station successfully receives one of the two duplicated data packets.

A radio link failure (RLF) event may occur in a process in which a terminal device communicates with a base station. If an RLF event occurs, the terminal device performs a radio resource control (RRC) re-establishment process, to restore a radio link between the terminal device and the base station. However, in a current RRC re-establishment process based on an RLF event, only a scenario in which a terminal device communicates with a base station on one carrier is considered, but a scenario in which a data packet is duplicately transmitted is not considered. Therefore, how to handle an RLF event in the scenario in which a data packet is duplicately transmitted is a problem that urgently needs to be resolved.

SUMMARY

This application provides a method for handling a radio link failure, a terminal device, and a network device, to optimize handling of the radio link failure.

According to a first aspect, an embodiment of this application provides a method for handling an RLF. The method includes: sending, by a terminal device, duplicated data packets to a base station on a first carrier and a second carrier; and sending, by the terminal device, RLF indication information to the base station when determining that an RLF event occurs on at least one of the first carrier and the second carrier, where the RLF indication information is used to indicate that the RLF event occurs on the first carrier, the second carrier, or the first carrier and the second carrier. Based on the technical solution, when determining that the RLF event occurs on some or all carriers, the terminal device may first notify the base station of the carriers on which the RLF event occurs, with no need to start an RRC re-establishment process.

With reference to the first aspect, in a first possible implementation of the first aspect, the first carrier is a first primary component carrier, and the second carrier is a first secondary component carrier. The method further includes: when the RLF event occurs on the first carrier but does not occur on the second carrier, receiving, by the terminal device, configuration information that is of a second primary component carrier and that is sent by the base station, and sending duplicated data packets to the base station on the second primary component carrier and the second carrier; when the RLF event does not occur on the first carrier but occurs on the second carrier, receiving, by the terminal device, configuration information that is of a second secondary component carrier and that is sent by the base station, and sending duplicated data packets to the base station on the first carrier and the second secondary component carrier; or when the RLF event occurs on both the first carrier and the second carrier, receiving, by the terminal device, the configuration information of the second primary component carrier and the configuration information of the second secondary component carrier that are sent by the base station, and sending duplicated data packets to the base station on the second primary component carrier and the second secondary component carrier. Based on the technical solution, when determining that the RLF event occurs on some or all carriers, the terminal device may continue to send the duplicated data packets on other carriers, with no need to start the RRC re-establishment process. Therefore, a quantity of RRC re-establishments can be reduced, thereby avoiding time consumption caused by the RRC re-establishments.

With reference to the first aspect, in a second possible implementation of the first aspect, the first carrier is a first secondary component carrier, and the second carrier is a second secondary component carrier. The method further includes: when the RLF event occurs on one of the first carrier and the second carrier but does not occur on the other of the first carrier and the second carrier, receiving, by the terminal device, configuration information of a third secondary component carrier, and sending duplicated data packets to the base station on the third secondary component carrier and the carrier on which the RLF event does not occur; or when the RLF event occurs on both the first carrier and the second carrier, receiving, by the terminal device, the configuration information of the third secondary component carrier and configuration information of a fourth secondary component carrier, and sending duplicated data packets to the base station on the third secondary component carrier and the fourth secondary component carrier. Based on the technical solution, when determining that the RLF event occurs on some or all carriers, the terminal device may continue to send the duplicated data packets on other carriers, with no need to start the RRC re-establishment process. Therefore, a quantity of RRC re-establishments can be reduced, thereby avoiding time consumption caused by the RRC re-establishments.

With reference to the first aspect, in a third possible implementation of the first aspect, the first carrier is a first primary component carrier, and the second carrier is a first secondary component carrier. The method further includes: when the RLF event occurs on the first carrier, receiving, by the terminal device, re-establishment instruction information and performing RRC re-establishment with the base station, where the re-establishment instruction information is used to instruct the terminal device to perform RRC re-establishment with the base station; and when the RLF event does not occur on the first carrier but occurs on the second carrier, receiving, by the terminal device, configuration information that is of a second secondary component carrier and that is sent by the base station, and sending duplicated data packets to the base station on the first carrier and the second secondary component carrier. Based on the technical solution, the terminal device performs RRC re-establishment only when the RLF event occurs on a primary component carrier. Therefore, a quantity of RRC re-establishments can be reduced, thereby avoiding time consumption caused by the RRC re-establishments.

With reference to the first possible implementation of the first aspect, in a fourth possible implementation of the first aspect, when the base station is a secondary base station and the RLF event occurs on the first carrier, the sending RLF indication information to the base station includes: sending, by the terminal device, the RLF indication information to the base station when the terminal device determines that a timer times out and the terminal device has not resumed use of the first carrier for sending a data packet to the base station, where the timer is started when the terminal device determines that the RLF event occurs on the first carrier. Based on the technical solution, the terminal device can send the RLF indication information to the base station only when the timer times out and communication has not been resumed. If the terminal device has resumed use of the first carrier for sending a data packet to the base station before the timer times out, the terminal device does not need to send the RLF indication information to the base station. Therefore, in the technical solution, unnecessary sending of the RLF indication information can be reduced.

With reference to first aspect or any possible implementation of the first aspect, in a fifth possible implementation of the first aspect, the method further includes: when determining that the RLF event occurs on at least one of the first carrier and the second carrier, sending, by the terminal device, at least one of the following information to the base station: the RLF event, downlink channel quality of a plurality of carriers, and a candidate carrier determined by the terminal device. In the technical solution, the base station can be assisted in determining a carrier that is to be switched to.

With reference to first aspect or any possible implementation of the first aspect, in a sixth possible implementation of the first aspect, before the sending, by a terminal device, duplicated data packets to a base station on a first carrier and a second carrier, the method further includes: determining, by the terminal device, that service related information satisfies a preset condition. In the technical solution, the terminal device can determine, on its own, whether a data packet needs to be duplicately transmitted.

With reference to the sixth possible implementation of the first aspect, in a seventh possible implementation of the first aspect, the service related information includes any one or more of the following: a QoS requirement for a service sent by the terminal device to the base station, a reliability requirement for the service sent by the terminal device to the base station, and channel quality of the first carrier and the second carrier. The technical solution provides a plurality of pieces of service related information that can help the terminal device determine whether a data packet needs to be duplicately transmitted.

With reference to first aspect or any possible implementation of the first aspect, in an eighth possible implementation of the first aspect, before the sending, by a terminal device, duplicated data packets to a base station on a first carrier and a second carrier, the method further includes: receiving, by the terminal device, a first threshold and a second threshold that are sent by the base station; determining, by the terminal device, the first carrier and the second carrier in a plurality of carriers based on transmission parameters of the plurality of carriers, the first threshold, and the second threshold, where a transmission parameter of the first carrier satisfies the first threshold, a transmission parameter of the second carrier satisfies the second threshold, and the transmission parameter includes one or more of the following: channel quality of a carrier, load of the carrier, a transmission error rate of the carrier, and a size of a data packet that can be transmitted on the carrier; and sending, by the terminal device, carrier indication information to the base station, where the carrier indication information is used to indicate a carrier that is determined by the terminal device and that is used to duplicately transmit a data packet. In the technical solution, the base station semi-statically indicates a carrier that can be selected by the terminal device and that is used to duplicately transmit a data packet. In this way, the terminal device may have specific permission to select the carrier that is used to duplicately transmit a data packet.

With reference to first aspect or any possible implementation of the first aspect, in a ninth possible implementation of the first aspect, the sending, by a terminal device, duplicated data packets to a base station on a first carrier and a second carrier includes: duplicating, by the terminal device, a to-be-sent first data packet, to obtain a second data packet; sending, by the terminal device, the first data packet to the base station on the first carrier; and sending, by the terminal device, the second data packet to the base station on the second carrier. Based on the technical solution, the base station can obtain a data packet that expects to be obtained, provided that one of two duplicated data packets is successfully transmitted. Therefore, in the technical solution, data packet transmission reliability is improved.

According to a second aspect, an embodiment of this application provides a method for handling an RLF. The method includes: receiving, by a base station on a first carrier and a second carrier, duplicated data packets sent by a terminal device; receiving, by the base station, RLF indication information sent by the terminal device, where the RLF indication information is used to indicate that an RLF event occurs on the first carrier, the second carrier, or the first carrier and the second carrier; and determining, by the base station based on the RLF indication information, a carrier that is in the first carrier and the second carrier and on which the RLF event occurs. Based on the technical solution, when the RLF event occurs on some or all carriers, the base station may first obtain the carriers on which the RLF event occurs, with no need to start an RRC re-establishment process.

With reference to the second aspect, in a first possible implementation of the second aspect, the first carrier is a first primary component carrier, and the second carrier is a first secondary component carrier. The method further includes: when determining that the RLF event occurs on the first carrier but does not occur on the second carrier, configuring, by the base station, a third secondary component carrier to a second primary component carrier, sending configuration information of the second primary component carrier to the terminal device, and receiving the duplicated data packets sent by the terminal device on the second primary component carrier and the second carrier; when determining that the RLF event does not occur on the first carrier but occurs on the second carrier, sending, by the base station, configuration information of a second secondary component carrier to the terminal device, and receiving the duplicated data packets sent by the terminal device on the first carrier and the second secondary component carrier; or when determining that the RLF event occurs on both the first carrier and the second carrier, configuring, by the base station, the third secondary component carrier to the second primary component carrier, sending the configuration information of the second primary component carrier and the configuration information of the second secondary component carrier to the terminal device, and receiving the duplicated data packets sent by the terminal device on the second primary component carrier and the second secondary component carrier. Based on the technical solution, when the RLF event occurs on some or all carriers, the base station may continue to receive, on other carriers, the duplicated data packets sent by the terminal device, with no need to start the RRC re-establishment process. Therefore, a quantity of RRC re-establishments can be reduced, thereby avoiding time consumption caused by the RRC re-establishments.

With reference to the second aspect, in a second possible implementation of the second aspect, the first carrier is a first secondary component carrier, and the second carrier is a second secondary component carrier. The method further includes: when determining that the RLF event occurs on one of the first carrier and the second carrier but does not occur on the other of the first carrier and the second carrier, sending, by the base station, configuration information of a third secondary component carrier to the terminal device, and receiving the duplicated data packets sent by the terminal device on the third secondary component carrier and the carrier on which the RLF event does not occur; or when determining that the RLF event occurs on both the first carrier and the second carrier, sending, by the base station, the configuration information of the third secondary component carrier and configuration information of a fourth secondary component carrier to the terminal device, and receiving the duplicated data packets sent by the terminal device on the third secondary component carrier and the fourth secondary component carrier. Based on the technical solution, when the RLF event occurs on some or all carriers, the base station may continue to receive, on other carriers, the duplicated data packets sent by the terminal device, with no need to start the RRC re-establishment process. Therefore, a quantity of RRC re-establishments can be reduced, thereby avoiding time consumption caused by the RRC re-establishments.

With reference to the second aspect, in a third possible implementation of the second aspect, the first carrier is a first primary component carrier, and the second carrier is a first secondary component carrier. The method further includes: when determining that the RLF event occurs on the first carrier, sending, by the base station, re-establishment instruction information to the terminal device and performing RRC re-establishment with the terminal device, where the re-establishment instruction information is used to instruct the terminal device to perform RRC re-establishment with the base station; and when determining that the RLF event does not occur on the first carrier but occurs on the second carrier, sending, by the base station, configuration information of a second secondary component carrier to the terminal device, and receiving the duplicated data packets sent by the terminal device on the first carrier and the second secondary component carrier. In the technical solution, RRC re-establishment is performed only when the RLF event occurs on a primary component carrier. Therefore, a quantity of RRC re-establishments can be reduced, thereby avoiding time consumption caused by the RRC re-establishments.

With reference to the second aspect or any possible implementation of the second aspect, in a fourth possible implementation of the second aspect, the method further includes: receiving, by the base station, at least one of the following information sent by the terminal device: the RLF event, downlink channel quality of a plurality of carriers, and a candidate carrier determined by the terminal device. The base station can determine a carrier that is to be switched to based on the information.

With reference to the second aspect or any possible implementation of the second aspect, in a fifth possible implementation of the second aspect, before the receiving, by a base station on a first carrier and a second carrier, duplicated data packets sent by a terminal device, the method further includes: sending, by the base station, a first threshold and a second threshold to the terminal device; and receiving, by the base station, carrier indication information sent by the terminal device, where the carrier indication information is used to indicate a carrier that is determined by the terminal device and that is used to duplicately transmit a data packet. In the technical solution, the base station semi-statically indicates a carrier that can be selected by the terminal device and that is used to duplicately transmit a data packet. In this way, the terminal device may have specific permission to select the carrier that is used to duplicately transmit a data packet.

With reference to any one of the second aspect or the first to the fourth possible implementations of the second aspect, in a sixth possible implementation of the second aspect, the duplicated data packets are duplicated packet data convergence protocol layer data packets or radio link control layer data packets. Before the receiving, by a base station on a first carrier and a second carrier, duplicated data packets sent by a terminal device, the method further includes: sending, by the base station, first indication information to the terminal device, where the first indication information is used to indicate that the first carrier is a carrier used for data transmission on a first logical channel; and sending, by the base station, second indication information to the terminal device, where the second indication information is used to indicate that the second carrier is a carrier used for data transmission on a second logical channel. In the technical solution, a carrier used to duplicately transmit a data packet can be directly indicated to the terminal device when a logical channel is configured.

According to a third aspect, this application provides a terminal device. The terminal device has functions that are implemented by the terminal device according to the first aspect or any possible implementation of the first aspect. The functions may be implemented by hardware, or may be implemented by hardware executing corresponding software. The hardware or software includes one or more modules corresponding to the foregoing functions.

According to a fourth aspect, this application provides a base station. The base station has functions that are implemented by the base station according to the second aspect or any possible implementation of the second aspect. The functions may be implemented by hardware, or may be implemented by hardware executing corresponding software. The hardware or software includes one or more modules corresponding to the foregoing functions.

According to a fifth aspect, this application provides a terminal device. The terminal device includes a processor and a transceiver. The processor is configured to support the terminal device in implementing corresponding functions according to the first aspect or any possible implementation of the first aspect, for example, determining that the RLF event occurs on at least one of the first carrier and the second carrier. The transceiver is configured to support the terminal device in sending, to a base station, information used in the foregoing method and receiving information that is sent by the base station and that is used in the foregoing method, for example, sending duplicated data packets to the base station on the first carrier and the second carrier. Optionally, the terminal device may further include a memory. The memory is configured to couple to the processor, and the memory stores a program instruction and data that are necessary to the terminal device.

According to a sixth aspect, this application provides a base station. The base station includes a processor and a transceiver. The processor is configured to support the base station in implementing corresponding functions according to the second aspect or any possible implementation of the second aspect, for example, determining, based on the RLF indication information, a carrier that is in the first carrier and the second carrier and on which the RLF event occurs. The transceiver is configured to support the base station in receiving information that is sent by the terminal device and that is used in the foregoing method and sending, to the terminal device, information used in the foregoing method. Optionally, the base station may further include a memory. The memory is configured to couple to the processor. The memory stores a program instruction and data that are necessary to the base station.

According to a seventh aspect, this application provides a computer-readable storage medium. The computer-readable storage medium stores an instruction. When the instruction is run on a computer, the computer is enabled to perform the method according to the first aspect or any possible implementation of the first aspect.

According to an eighth aspect, this application provides a computer-readable storage medium. The computer-readable storage medium stores an instruction. When the instruction is run on a computer, the computer is enabled to perform the method according to the second aspect or any possible implementation of the second aspect.

According to a ninth aspect, this application provides a processing apparatus, including a processor and an interface. The processor is configured to support the processing apparatus in implementing functions in the first aspect or any possible implementation of the first aspect. For example, the processor may be configured to: generate duplicated data packets, determine that an RLF event occurs on at least one of a first carrier and a second carrier, and generate RLF indication information. The processor sends the generated duplicated data packets and RLF indication information to a transceiver of the terminal device through the interface, so that the transceiver sends the duplicated data packets and the RLF indication information to a base station. The processing apparatus may be implemented by a chip or other hardware (e.g., a logical circuit or an integrated circuit).

According to a tenth aspect, this application provides a processing apparatus, including a processor and an interface. The processor is configured to support the processing apparatus in implementing functions in the second aspect or any possible implementation of the second aspect. For example, the processor may be configured to: obtain RLF indication information through the interface, and determine, based on the RLF indication information, a carrier that is in a first carrier and a second carrier and on which an RLF event occurs. The processing apparatus may be implemented by a chip or other hardware (e.g., a logical circuit or an integrated circuit).

According to an eleventh aspect, this application provides a computer program product including an instruction. When the computer program product is run on a computer, the computer is enabled to perform the method according to the first aspect or any possible implementation of the first aspect.

According to a twelfth aspect, this application provides a computer program product including an instruction. When the computer program product is run on a computer, the computer is enabled to perform the method according to the second aspect or any possible implementation of the second aspect.

DESCRIPTION OF EMBODIMENTS

The following describes technical solutions of this application with reference to accompanying drawings.

It should be understood that the technical solutions in the embodiments of this application may be applied to various communications systems, for example, a long term evolution (LTE) system, an LTE frequency division duplex (FDD) system, an LTE time division duplex (TDD) system, a 4.5th generation (4.5G) network, a fifth generation (5th generation, 5G) network, and new radio (NR).

Figure 1:
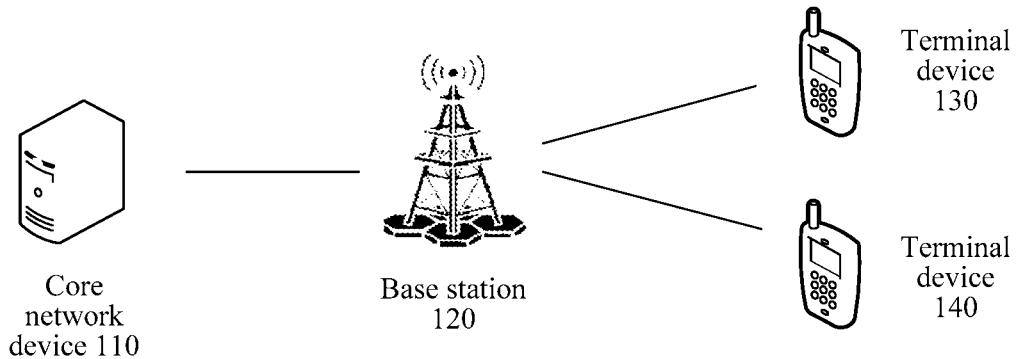
FIG. 1 is a schematic architectural diagram of a mobile communications system to which embodiments of this application are applied.

FIG. 1 is a schematic architectural diagram of a mobile communications system to which the embodiments of this application are applied. As shown in FIG. 1, the mobile communications system includes a core network device 110, a base station 120, and at least one terminal device (e.g., a terminal device 130 and a terminal device 140 in FIG. 1). The terminal device is connected to the base station in a wireless manner, and the base station is connected to the core network device in a wireless or wired manner. The core network device and the base station may be different independent physical devices, or a function of the core network device and a logical function of the base station may be integrated on a same physical device, or a physical device integrates some functions of the core network device and some functions of the base station. The terminal device may be fixed or mobile. FIG. 1 is only a schematic diagram, and the communications system may further include other network devices, for example, may further include a wireless relay device and a wireless backhaul device, which are not shown in FIG. 1. The embodiments of this application impose no limitation on quantities of core network devices, base stations, and terminal devices included in the mobile communications system.

The base station, which may also be referred to as an access network device, is an access device that is accessed by the terminal device in a wireless manner in the mobile communications system, and may be a NodeB, an evolved NodeB (eNodeB), a base station in a 5G mobile communications system, a base station in a future mobile communications system, an access node in a Wi-Fi system, or the like. The embodiments of this application impose no limitation on a specific technology and a specific device form used by the base station.

The terminal device may also be referred to as a terminal, user equipment (UE), a mobile station (MS), a mobile terminal (MT), or the like. The terminal device may be a mobile phone, a tablet computer (Pad), a computer having a wireless transmission and receiving function, a virtual reality (VR) terminal device, an augmented reality (AR) terminal device, a wireless terminal related to industrial control, a wireless terminal related to self driving, a wireless terminal related to remote medical surgery, a wireless terminal related to a smart grid, a wireless terminal related to transportation safety, a wireless terminal related to a smart city, a wireless terminal related to a smart home, or the like.

The base station and the terminal device each may be deployed on land, including an indoor or outdoor device, a handheld device, or an in-vehicle device, may be deployed at a water surface, or may be deployed on an airplane, in a balloon, or on a satellite in air. The embodiments of this application impose no limitation on application scenarios of the base station and the terminal device.

The embodiments of this application may be applicable to downlink signal transmission, uplink signal transmission, or device to device (D2D) signal transmission. For the downlink signal transmission, a sending device is a base station, and a corresponding receiving device is a terminal device. For the uplink signal transmission, a sending device is a terminal device, and a corresponding receiving device is a base station. For the D2D signal transmission, a sending device is a terminal device, and a corresponding receiving device is also a terminal device. The embodiments of this application impose no limitation on a signal transmission direction.

Communication may be performed between the base station and the terminal device and between the terminal devices through a licensed spectrum, or through an unlicensed spectrum, or through both a licensed spectrum and an unlicensed spectrum. Communication may be performed between the base station and the terminal device and between the terminal devices through a frequency spectrum below 6G, or through a frequency spectrum above 6G, or through both a frequency spectrum below 6G and a frequency spectrum above 6G. The embodiments of this application impose no limitation on spectrum frequencies used for the base station and the terminal device.

Figure 2:
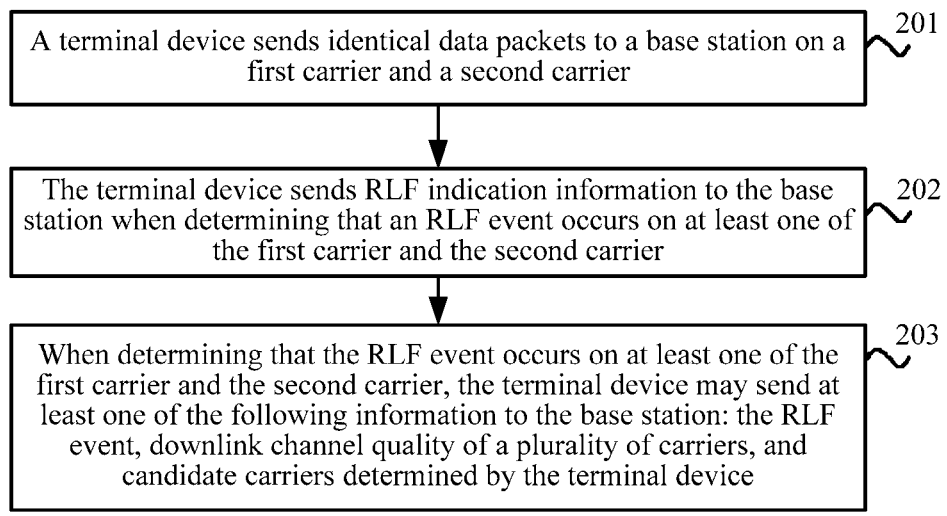
FIG. 2 is a schematic flowchart of a method for handling an RLF according to an embodiment of this application.

FIG. 2 is a schematic flowchart of a method for handling an RLF according to an embodiment of this application.

201. A terminal device sends duplicated data packets to a base station on a first carrier and a second carrier.

Specifically, the terminal device may duplicate a to-be-sent first data packet to obtain a second data packet; send the first data packet to the base station on the first carrier; and send the second data packet to the base station on the second carrier.

The first carrier described in this embodiment of this application may be one carrier, or may be a carrier group including a plurality of carriers. The second carrier described in this embodiment of this application may be one carrier, or may be a carrier group including a plurality of carriers. When the first carrier is a primary component carrier or includes a primary component carrier, the first carrier may be referred to as a first primary component carrier. When the first carrier does not include a primary component carrier, the first carrier may be referred to as a first secondary component carrier. Cases for the second carrier, a third carrier, and the like are similar. "First" and "second" in the first carrier, the second carrier, the first primary component carrier, a second secondary component carrier, and the like described in this embodiment of this application are only intended to distinguish different carriers, primary component carriers, and secondary component carriers.

Optionally, in some embodiments, the terminal device may send the duplicated data packets to the base station only on the first carrier and the second carrier.

Optionally, in some other embodiments, the terminal device may alternatively send the duplicated data packets to the base station on M carriers, where M is a positive integer greater than or equal to 3. In this case, the terminal device may duplicate a to-be-sent first data packet to obtain M data packets included in the first data packet, and send the M duplicated data packets to the base station on the M carriers, thereby improving data transmission reliability. A method used by the terminal device to process an RLF in a case in which the terminal device sends duplicated data packets to the base station on the M carriers is similar to the method used by the terminal device to process an RLF in a case in which the terminal device sends duplicated data packets to the base station on two carriers. In other words, the first carrier and the second carrier may be any two of the M carriers.

Optionally, in some other embodiments, for example, in a dual connectivity scenario, the carrier may be a link between different base stations, and the base station may be a primary base station or a secondary base station. In this case, when the first carrier is a primary component carrier of a primary base station or includes a primary component carrier of a primary base station, the first carrier may be referred to as a first primary component carrier. When the first carrier does not include a primary component carrier of a primary base station, the first carrier may be referred to as a first secondary component carrier. Cases for the second carrier, a third carrier, and the like are similar.

Unless otherwise specially stated, the duplicated data packets described in this embodiment of this application may be duplicated packet data convergence protocol (PDCP) layer data packets, duplicated radio link control (RLC) layer data packets, or duplicated media access control (MAC) layer data packets.

For example, when PDCP layer data packets are duplicately transmitted, one PDCP entity is bound with two RLC entities. The terminal device duplicates a to-be-sent first PDCP layer data packet, to obtain a second PDCP layer data packet. The terminal device delivers the first PDCP layer data packet to one of the two RLC entities, and delivers the second PDCP layer data packet to the other of the two RLC entities. The two RLC entities separately process the received PDCP layer data packets and send the first PDCP layer data packet and the second PDCP layer data packet to the base station on two different carriers. A process in which the two RLC entities process the received PDCP layer data packets is the same as a manner in the prior art in which an RLC entity processes a PDCP layer data packet in a case of no duplication transmission. Details are not further described herein.

The RLC entity that is used by the terminal device to perform a duplication transmission function may be configured by the base station by using RRC signaling. For example, the base station may configure that the terminal device can use five RLC entities to perform duplication transmission, and two of the five RLC entities are in an active state. In this case, the terminal device may use the two RLC entities to perform duplication transmission.

For another example, when RLC layer data packets are duplicately transmitted, the terminal device duplicates a to-be-sent first RLC layer data packet, to obtain a second RLC layer data packet. The terminal device sends the first RLC layer data packet and the second RLC layer data packet to the MAC entity. The MAC entity processes the two RLC layer data packets, and sends the two RLC layer data packets to the base station on two different carriers. A process in which the MAC layer entity processes the RLC layer data packets is the same as a manner in which a MAC entity processes an RLC layer data packet in a case of no duplication transmission. Details are not further described herein.

For another example, when MAC layer data packets are duplicately transmitted, the terminal device duplicates a to-be-sent first MAC layer data packet, to obtain a second MAC layer data packet, and sends the two MAC layer data packets to the base station on two different carriers.

The terminal device may perform duplication transmission on one of the PDCP layer data packets, the RLC layer data packets, and the MAC layer data packets. Alternatively, the terminal device may perform duplication transmission on any two or all of the PDCP layer data packets, the RLC layer data packets, and the MAC layer data packets.

It may be understood that, duplication transmission (duplicated transmission) in duplicately transmitting a data packet or a function of duplicately transmitting a data packet described in this embodiment of this application means that a data packet is duplicated to obtain two or more duplicated data packets, and the two or more duplicated data packets are respectively transmitted on different carriers. The duplication transmission described in this embodiment of this application does not refer to data packet retransmission in a mechanism such as an automatic repeat request.

Optionally, in some embodiments, after the base station configures the duplication transmission function and a logical channel used for the duplication transmission function, the duplication transmission function may be always in an active state. In other words, the terminal device may always perform duplication transmission on a data packet.

Optionally, in some other embodiments, after the base station configures the duplication transmission function and a logical channel used for the duplication transmission function, the duplication transmission function is in a deactive state or an active state.

Optionally, in some embodiments, the base station may determine whether to activate the duplication transmission function, and indicate, to the terminal device, whether the duplication transmission function is to be activated.

Optionally, in some embodiments, the base station may determine, based on one or more of channel quality, load of a channel, and a transmission error rate of the channel, whether to activate the duplication transmission function. The base station may send a media access control (MAC) control element (CE) to the terminal device to instruct the terminal device to activate or deactivate the duplication transmission function.

Specifically, indication information carried in the MAC CE may include a logical channel identifier (logical channel ID, LCID) field or a data radio bearer identifier (data radio bearer ID, DRB ID) field, and a status indicator field. When the MAC CE is used to activate the duplication transmission function, the logical channel identifier field or the data radio bearer identifier field in the indication information carried in the MAC CE is used to indicate that a duplication transmission function of which logical channels or which DRB is to be activated, and the status indicator field is used to instruct to activate a state.

After receiving the MAC CE, the terminal device may determine an activation operation based on the status indicator field, and determine, based on a logical channel identifier indicated by the logical channel identifier field, that a duplication transmission function of which logical channels is to be activated, where the logical channel identifier field only needs to indicate one of several logical channels in a same duplication transmission. For example, a logical channel 1, a logical channel 2, and a logical channel 3 may be used for one duplication transmission, and a logical channel 4 and a logical channel 5 may be used for another duplication transmission. The logical channel identifier field only needs to instruct to activate the logical channel 1. When determining that the logical channel identifier field instructs to activate the logical channel 1, the terminal device may determine that the logical channel 2 and the logical channel 3 are also activated. Certainly, the logical channel identifier field may alternatively indicate all logical channels in a same duplication transmission.

Alternatively, after receiving the MAC CE, the terminal device may determine an activation operation based on the status indicator field, and determine, based on a DRB identifier indicated by the data radio bearer identifier field, that a duplication transmission function of which DRB is to be activated.

When the MAC CE is used to deactivate the duplication transmission function, the logical channel identifier field or the data radio bearer identifier field in the indication information carried in the MAC CE is used to indicate that a duplication transmission function of which logical channels or which DRB is to be deactivated, and the status indicator field is used to instruct to deactivate a state.

After receiving the MAC CE, the terminal device may determine a deactivation operation based on the status indicator field, and determine, based on a logical channel identifier indicated by the logical channel identifier field, that a duplication transmission function of which logical channels is to be deactivated, where the logical channel identifier field further indicates one or more logical channels that are to be deactivated.

Alternatively, after receiving the MAC CE, the terminal device may determine a deactivation operation based on the status indicator field, and determine, based on a DRB identifier indicated by the data radio bearer identifier field, that a duplication transmission function of which DRB is to be deactivated.

Optionally, after the duplication transmission function is deactivated, the terminal device uses one logical channel to transmit data, and ignore a pre-configured binding-based transmission relationship between the logical channel and carriers. The binding-based transmission relationship is a relationship that is configured by the base station and that indicates that data on a logical channel needs to transmitted on a carrier. Formats of the MAC CE used for activation and the MAC CE used for deactivation may be the same or different. Optionally, in some embodiments, the status indicator field may include one bit. For example, that a value of the status indicator field in the MAC CE is 0 may indicate that the MAC CE is a MAC CE used for deactivation, and is used to deactivate duplication transmission. That the value of the status indicator field in the MAC CE is 1 may indicate that the MAC CE is a MAC CE used for activation, and is used to activate duplication transmission. The logical channel identifier field may include six bits, and the data radio bearer identifier field may include five bits. In addition, the MAC CE may have an N-bit reserved field, where N is a positive integer, so that a size of the MAC CE is one byte. One byte is equal to eight bits. The size of the MAC CE may be always a multiple of a quantity of bytes. If a sum of the status indicator field and the logical channel identifier field or a sum of the status indicator field and the data radio bearer identifier field is N bits and N is greater than 8, a size of the reserved field is 16-N bits, and the size of the MAC CE is two bytes. If a sum of the status indicator field and the logical channel identifier field or a sum of the status indicator field and the data radio bearer identifier field is N bits and N is less than 8, a size of the reserved field is 8-N bits, and the size of the MAC CE is one byte.

In a carrier aggregation (CA) scenario, the MAC CE used to activate and deactivate the duplication transmission function is delivered by a MAC entity of the base station. In a dual connectivity (DC) scenario, the MAC CE used to activate and deactivate the duplication transmission function may be delivered by only a primary base station (master node, MN), or may be delivered by only a secondary base station, or may be separately delivered by a primary base station and a secondary base station. After receiving MAC CEs sent by one or more base stations, the terminal device needs to comprehensively consider indication information carried in the MAC CEs delivered by the one or more base stations, to determine whether a duplication transmission function of a DRB needs to be in an active or de-active state in this case. For example, it is assumed that the terminal device receives two MAC CEs respectively from the primary base station and the secondary base station. If the MAC CEs delivered by the two base stations both indicate that a duplication transmission function of a DRB is to be activated, the UE activates the duplication transmission function of the DRB. If the MAC CEs delivered by the two base stations both indicate that a duplication transmission function of a DRB is to be deactivated, the UE deactivates the duplication transmission function of the DRB, and selects a link for transmission. If one of the MAC CEs delivered by the two base stations indicates that a duplication transmission function of a DRB is to be activated, and the other indicates that the duplication transmission function of the DRB is to be deactivated, the UE deactivates the duplication transmission function of the DRB, and selects the base station that delivers the MAC CE used for deactivation to transmit data. In addition, optionally, when comprehensively considering the MAC CEs delivered by the two base stations, the UE selects a latest one of MAC CEs delivered by the two base stations, to perform process, and optionally, may set a timer for each MAC CE. The timer is started when receiving the MAC CE. After a timer times out, the UE does not take a MAC CE corresponding to the timer into account during decision-making.

Optionally, in some other embodiments, before step 201, the terminal device may receive duplicate-transmission indication information sent by the base station, where the duplicate-transmission indication information is used to instruct the terminal device to duplicately transmit a data packet. In other words, the method shown in FIG. 2 is performed after the terminal device receives the duplicate-transmission indication information. The duplicate-transmission indication information may further be used to indicate a type of a duplicately transmitted data packet, and the type of the duplicately transmitted data packet may be at least one of a PDCP layer data packet, an RLC layer data packet, and a MAC layer data packet.

Optionally, in some other embodiments, the terminal device may determine, on its own and based on pre-configured adjustment, whether to activate the duplication transmission function. Specifically, before step 201, the terminal device may determine that service related information satisfies a preset condition. In other words, the method shown in FIG. 2 is performed when the terminal device determines that the service related information satisfies the preset condition. The preset condition may include preset conditions of a plurality of levels. Types of data packets duplicately transmitted when different levels of preset conditions are satisfied may be different. For example, when the service related information satisfies a first-level preset condition, the terminal device may duplicately transmit a PDCP layer data packets. When the service related information satisfies a second-level preset condition, the terminal device may duplicately transmit an RLC layer data packet. When the service related information satisfies a third-level preset condition, the terminal device may duplicately transmit a MAC layer data packet.

The service related information may be quality related information of a service sent by the terminal device to the base station. For example, the service related information may be a quality of service (QoS) requirement for the service sent by the terminal device to the base station. For another example, the service related information may be a reliability requirement for the service sent by the terminal device to the base station. Alternatively, the service related information may be information related to service transmission. For example, the service related information may be channel quality of the first carrier and the second carrier. For another example, the service related information may alternatively be a size of a to-be-sent data packet. Alternatively, the service related information may be attribute information of a service. For example, the service related information may alternatively be a size of a to-be-sent data packet.

The service related information may include one piece of information or a plurality of pieces of information. For example, the service related information may be one or more of the QoS requirement of the service sent by the terminal device to the base station, the reliability requirement of the service sent by the terminal device to the base station, the size of the to-be-sent data packet, and the channel quality of the first carrier and the second carrier.

Optionally, in some embodiments, before step 201, the terminal device further needs to determine the first carrier and the second carrier.

Optionally, in some embodiments, the base station may directly indicate, to the terminal device, a carrier used to duplicately transmit a data packet.

Optionally, in some other embodiments, the base station may send a first threshold and a second threshold to the terminal device. The terminal device may determine the first carrier and the second carrier in a plurality of carriers based on transmission parameters of the plurality of carriers, the first threshold, and the second threshold, where a transmission parameter of the first carrier satisfies the first threshold, and a transmission parameter of the second carrier satisfies the second threshold. The transmission parameter may include one or more of the following: channel quality of a carrier, load of the carrier, a transmission error rate of the carrier, and a size of a data packet that can be transmitted on the carrier.

Optionally, in some other embodiments, the data packet duplicately transmitted when the terminal device performs data packet duplication transmission is a PDCP layer data packet or an RLC layer data packet. In this case, the base station may send first indication information and second indication information to the terminal device, where the first indication information is used to indicate that the first carrier is a carrier used for data transmission on a first logical channel, and the second indication information is used to indicate that the second carrier is a carrier used for data transmission on a second logical channel.

202. The terminal device sends RLF indication information to the base station when determining that an RLF event occurs on at least one of the first carrier and the second carrier, where the RLF indication information is used to indicate that the RLF event occurs on the first carrier, the second carrier, or the first carrier and the second carrier.

Optionally, in some embodiments, the terminal device may send the RLF indication information to the base station through explicit indication. For example, the terminal device may send RLF indication signaling to the base station, where the RLF indication signaling includes a plurality of bits, and a value of the plurality of bits is a carrier number corresponding to a carrier on which the RLF event occurs.

Optionally, in some embodiments, the terminal device may send the RLF indication information to the base station through implicit indication. For example, the terminal device may send, to the base station, some information corresponding to a carrier, to indicate a carrier on which the RLF event occurs. For example, if the data packet is a PDCP layer data packet or an RLC layer data packet, the terminal device may indicate, to the base station, a logical channel corresponding to the carrier on which the RLF event occurs. In this way, the base station may determine, based on the logical channel, the carrier on which the RLF event occurs. The logical channel corresponding to the carrier means that the carrier is used to send a data packet that is on the logical channel.

Optionally, in some embodiments, the terminal device may send the RLF indication information to the base station when determining that the RLF event occurs on the first carrier but does not occur on the second carrier. In this case, the RLF indication information is used to indicate that the RLF event occurs on the first carrier.

Optionally, in some embodiments, the terminal device may send the RLF indication information to the base station when determining that the RLF event does not occur on the first carrier but occurs on the second carrier. In this case, the RLF indication information is used to indicate that the RLF event occurs on the second carrier.

Optionally, in some embodiments, the terminal device may send the RLF indication information to the base station when determining that the RLF event occurs on both the first carrier and the second carrier. In this case, the RLF indication information is used to indicate that the RLF event occurs on both the first carrier and the second carrier. Optionally, in some embodiments, when the RLF event occurs on both the first carrier and the second carrier, an RLF event that occurs on the first carrier and an RLF event that occurs on the second carrier may be the same. Optionally, in some other embodiments, when the RLF event occurs on both the first carrier and the second carrier, an RLF event that occurs on the first carrier and an RLF event that occurs on the second carrier may be different.

Optionally, in some embodiments, the first carrier may be a first primary component carrier, and the second carrier may be a first secondary component carrier. The base station may determine a carrier to replace the carrier on which the RLF event occurs. Specifically, when determining that the RLF event occurs on the first carrier but does not occur on the second carrier, the base station may configure a third secondary component carrier to a second primary component carrier, and send configuration information of the second primary component carrier to the terminal device. When configuring the third secondary component carrier to the second primary component carrier, the base station may indicate, to the terminal device, that the third secondary component carrier is configured to the second primary component carrier. The configuration information may include uplink and downlink channel configuration parameters of a carrier, parameter configuration of various protocol layers (including an RRC layer), a service data adaption protocol (SDAP) layer, a PDCP layer, an RLC layer, a MAC layer, and a physical layer), security parameter configuration, paging and broadcast receiving configuration. After receiving the configuration information of the second primary component carrier, the terminal device may send the duplicated data packets to the base station on the second primary component carrier and the second carrier. When determining that the RLF event does not occur on the first carrier but occurs on the second carrier, the base station may send configuration information of a second secondary component carrier to the terminal device. When receiving the configuration information of the second secondary component carrier, the terminal device may send the duplicated data packets to the base station on the first carrier and the second secondary component carrier. When determining that the RLF event occurs on both the first carrier and the second carrier, the base station may configure the third secondary component carrier to the second primary component carrier, and send the configuration information of the second primary component carrier and the configuration information of the second secondary component carrier to the terminal device. When receiving the configuration information of the second primary component carrier and the configuration information of the second secondary component carrier, the terminal device may send the duplicated data packets to the base station on the second primary component carrier and the second secondary component carrier.

Optionally, in some embodiments, the first carrier may be a first secondary component carrier, and the second carrier may be a second secondary component carrier. The base station may determine a carrier to replace the carrier on which the RLF event occurs. Specifically, when determining that the RLF event occurs on one of the first carrier and the second carrier but does not occur on the other of the first carrier and the second carrier, the base station may send configuration information of a third secondary component carrier to the terminal device. When receiving the configuration information of the third secondary carrier, the terminal device may send the duplicated data packets to the base station on the third secondary component carrier and the carrier on which the RLF event does not occur. When determining that the RLF event occurs on both the first carrier and the second carrier, the base station may send the configuration information of the third secondary component carrier and configuration information of a fourth secondary component carrier to the terminal device. When receiving the configuration information of the third secondary component carrier and the configuration information of the fourth secondary component carrier, the terminal device may send the duplicated data packets to the base station on the third secondary component carrier and the fourth secondary component carrier.

Optionally, in some embodiments, the first carrier may be a first primary component carrier, and the second carrier may be a first secondary component carrier. When determining that the RLF event occurs on the first carrier, the base station may send re-establishment instruction information to the terminal device, where the re-establishment instruction information is used to instruct the terminal device to perform RRC re-establishment with the base station. When receiving the re-establishment instruction information, the terminal device may perform RRC re-establishment with the base station. When determining that the RLF event does not occur on the first carrier but occurs on the second carrier, the base station may send configuration information of a second secondary component carrier to the terminal device. When receiving the configuration information of the second secondary component carrier, the terminal device may send the duplicated data packets to the base station on the first carrier and the second secondary component carrier.

Further, when the base station is a secondary base station and the RLF event occurs on the first carrier, the terminal device may start a timer when determining that the RLF event occurs on the first carrier. When the timer times out and the terminal device has not resumed use of the first carrier for sending a data packet to the base station, the terminal device may send the RLF indication information to the base station. When the terminal device has resumed use of the first carrier for sending a data packet to the base station before the timer times out, the terminal device may determine that the RLF event does not occur on the first carrier, and may not send the RLF indication information to the base station.

Further, in some embodiments, the method shown in FIG. 2 may further include step 203.

203. When determining that the RLF event occurs on at least one of the first carrier and the second carrier, the terminal device may send at least one of the following information to the base station: the RLF event, downlink channel quality of a plurality of carriers, and a candidate carrier determined by the terminal device.

Optionally, in some embodiments, when determining that the RLF event occurs on at least one of the first carrier and the second carrier, the terminal device may send any one of the RLF event, the downlink channel quality of the plurality of carriers, and the candidate carriers determined by the terminal device to the base station.

Optionally, in some other embodiments, when determining that the RLF event occurs on at least one of the first carrier and the second carrier, the terminal device may send any two of the RLF event, the downlink channel quality of the plurality of carriers, and the candidate carriers determined by the terminal device to the base station.

Optionally, in some other embodiments, when determining that the RLF event occurs on at least one of the first carrier and the second carrier, the terminal device may send the RLF event, the downlink channel quality of the plurality of carriers, and the candidate carriers determined by the terminal device to the base station.

The base station may determine the RLF event based on the RLF event sent by the terminal device, thereby performing subsequent processing.

When receiving the downlink channel quality of the plurality of carriers, the base station determines one of the plurality of carriers based on the downlink channel quality of the plurality of carriers, and replace the carrier on which the RLF event occurs with the determined carrier. It may be understood that, the carrier determined by the base station is different from the carrier on which the RLF event occurs, and is also different from a carrier that has been used to send a data packet the same as the carrier on which the RLF event occurs.

When receiving the candidate carriers determined by the terminal device, the terminal device may determine one of the candidate carriers, and replace the carrier on which the RLF event occurs with the determined carrier. It may be understood that, the carrier determined by the base station is different from the carrier on which the RLF event occurs, and is also different from a carrier that has been used to send a data packet the same as the carrier on which the RLF event occurs.

Unless otherwise specially stated, the RLF event described in this embodiment of this application may be an RLF event in the prior art, for example, a quantity of retransmissions of an RLC layer data packet reaches a maximum retransmission quantity, a link failure is caused due to an out-of-synchronization signal, or a quantity of random accesses reaches a maximum quantity. This is not limited in this embodiment of this application.

Optionally, in some embodiments, the terminal device may perform RRC re-establishment when determining that a quantity of retransmissions of an RLC layer data packet sent by the terminal device on the first carrier and a quantity of retransmissions of an RLC layer data packet sent by the terminal device on the second carrier both reach a maximum retransmission quantity. In other words, the terminal device does not perform RRC re-establishment provided that a quantity of retransmissions of an RLC layer data packet sent by the terminal device on one of the first carrier and the second carrier does not reach the maximum retransmission quantity.

Optionally, in some embodiments, the terminal device may perform RRC re-establishment when determining that a quantity of retransmissions of a first RLC layer data packet sent on the first carrier and a quantity of retransmissions of the first RLC layer data packet sent on the second carrier both reach a maximum retransmission quantity. In other words, the terminal device performs RRC re-establishment only when a quantity of retransmissions of an RLC layer data packet on the first carrier and a quantity of retransmissions of an RLC layer data packet on the second carrier both reach a maximum retransmission quantity and the RLC layer data packets for which quantities of retransmissions reach the maximum retransmission quantity are a same data packet. For example, it is assumed that the maximum retransmission quantity is 5. If the quantity of retransmissions of the first RLC layer data packet on the first carrier reaches the maximum retransmission quantity 5, and the first RLC layer data packet is successfully transmitted on the second carrier when the first RLC layer data packet is retransmitted only twice, the terminal device does not perform RRC re-establishment. The terminal device performs RRC re-establishment only when the quantities of retransmission of the first RLC layer data packet on the first carrier and the second carrier both reach the maximum retransmission quantity.

The RRC re-establishment described in this embodiment of this application is the same as an RRC re-establishment process in the prior art. Details are not further described herein.

Figure 3:
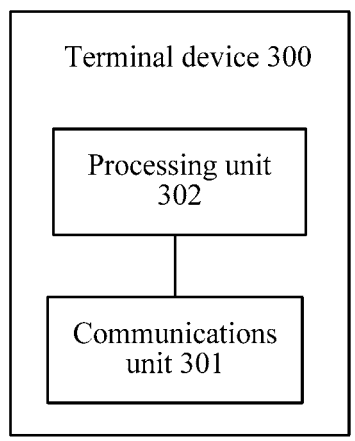
FIG. 3 is a structural block diagram of a terminal device according to an embodiment of this application.

FIG. 3 is a structural block diagram of a terminal device according to an embodiment of this application. As shown in FIG. 3, the terminal device 300 includes a communications unit 301 and a processing unit 302.

The communications unit 301 is configured to send duplicated data packets to a base station on a first carrier and a second carrier.

The processing unit 302 is configured to determine that an RLF event occurs on at least one of the first carrier and the second carrier.

The communications unit 301 is further configured to send RLF indication information to the base station when the processing unit 302 determines that the RLF event occurs on at least one of the first carrier and the second carrier, where the RLF indication information is used to indicate that the RLF event occurs on at least one of the first carrier and the second carrier.

The communications unit 301 may be implemented by a transceiver, and the processing unit 302 may be implemented by a processor. For specific functions and beneficial effects of the communications unit 301 and the processing unit 302, refer to the method shown in FIG. 2. Details are not further described herein.

Figure 4:
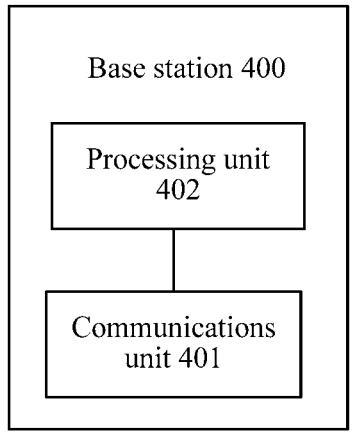
FIG. 4 is a structural block diagram of a base station according to an embodiment of this application.

FIG. 4 is a structural block diagram of a base station according to an embodiment of this application. As shown in FIG. 4, the base station 400 includes a communications unit 401 and a processing unit 402.

The communications unit 401 is configured to receive, on a first carrier and a second carrier, duplicated data packets sent by a terminal device.

The communications unit 401 is further configured to receive RLF indication information sent by the terminal device, where the RLF indication information is used to indicate that an RLF event occurs on at least one of the first carrier and the second carrier.

The processing unit 402 is configured to determine, based on the RLF indication information, a carrier that is in the first carrier and the second carrier and on which the RLF event occurs.

The communications unit 401 may be implemented by a transceiver, and the processing unit 402 may be implemented by a processor. For specific functions and beneficial effects of the communications unit 401 and the processing unit 402, refer to the method shown in FIG. 2. Details are not further described herein.

Figure 5:
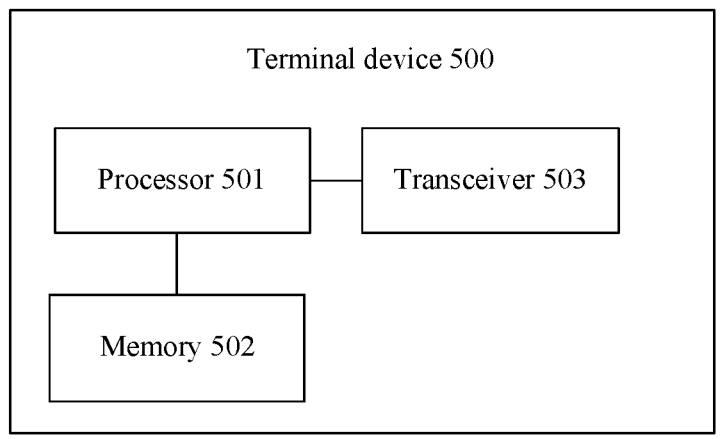
FIG. 5 is a structural block diagram of a terminal device according to an embodiment of the present invention.

FIG. 5 is a structural block diagram of a terminal device according to an embodiment of the present invention. The terminal device 500 shown in FIG. 5 includes a processor 501, a memory 502, and a transceiver 503.

The processor 501, the memory 502, and the transceiver 503 communicate with each other through an internal connection path, to transfer a control and/or data signal.

The method disclosed in the foregoing embodiment of the present invention may be applied to the processor 501, or implemented by the processor 501. The processor 501 may be an integrated circuit chip and has a signal processing capability. In an implementation process, steps in the foregoing method can be implemented by using a hardware integrated logical circuit in the processor 501, or by using instructions in a form of software. The processor 501 may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory 502, and the processor 501 reads instructions in the memory 502 and completes the steps in the foregoing method in combination with hardware of the processor.

It may be understood that, although not shown, the terminal device 500 may further include other apparatuses, for example, an input apparatus, an output apparatus, and a battery.

Optionally, in some embodiments, the memory 502 may store an instruction used to perform the method that is performed by the terminal device in the method shown in FIG. 2. The processor 501 may perform the instruction stored in the memory 502 and complete, in combination with other hardware (e.g., the transceiver 503), steps performed by the terminal device in the method shown in FIG. 2. For a specific working process and beneficial effects, refer to the descriptions in the embodiment shown in FIG. 2.

Figure 6:
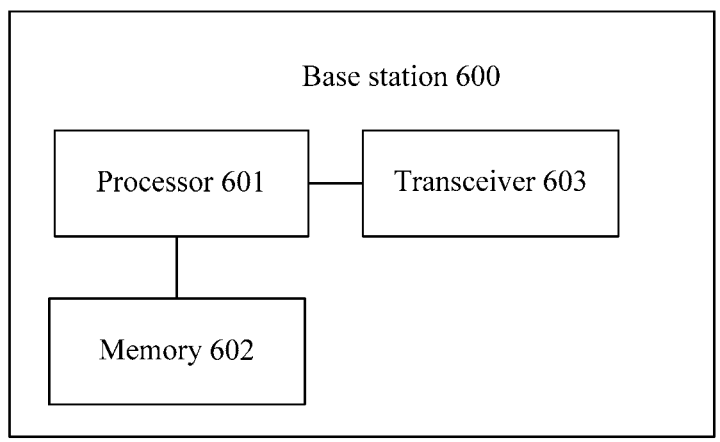
FIG. 6 is a structural block diagram of a base station according to an embodiment of the present invention.

FIG. 6 is a structural block diagram of a base station according to an embodiment of the present invention. The base station 600 shown in FIG. 6 includes a processor 601, a memory 602, and a transceiver 603.

The processor 601, the memory 602, and the transceiver 603 communicate with each other through an internal connection path, to transfer a control and/or data signal.

The method disclosed in the foregoing embodiment of the present invention may be applied to the processor 601, or implemented by the processor 601. The processor 601 may be an integrated circuit chip and has a signal processing capability. In an implementation process, steps in the foregoing method can be implemented by using a hardware integrated logical circuit in the processor 601, or by using instructions in a form of software. The processor 601 may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by means of a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, or a register. The storage medium is located in the memory 602, and the processor 601 reads instructions in the memory 602 and completes the steps in the foregoing method in combination with hardware of the processor.

Optionally, in some embodiments, the memory 602 may store an instruction used to perform the method that is performed by the base station in the method shown in FIG. 2. The processor 601 may perform the instruction stored in the memory 602 and complete, in combination with other hardware (e.g., the transceiver 603), steps performed by the base station in the method shown in FIG. 2. For a specific working process and beneficial effects, refer to the descriptions in the embodiment shown in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

An embodiment of this application further provides a communications apparatus. The communications apparatus may be a terminal or a circuit. The communications apparatus may be configured to perform actions performed by the terminal device in the foregoing method embodiment.

Figure 7:
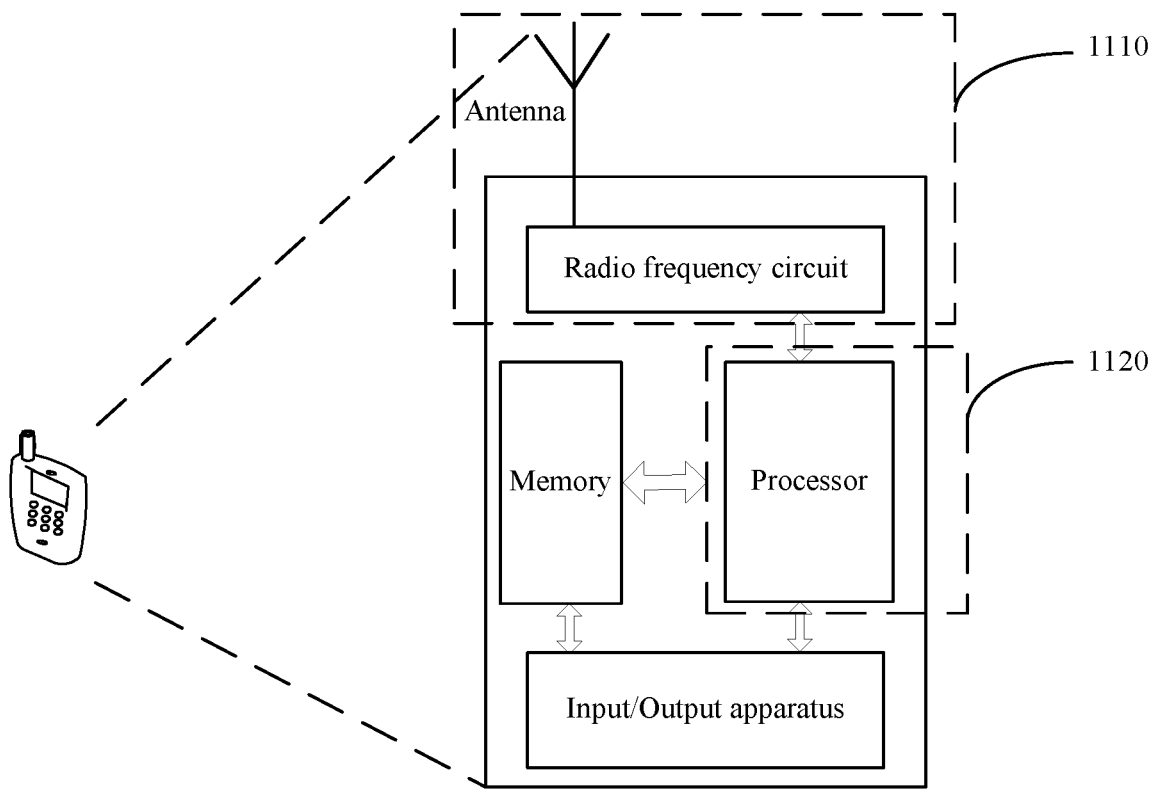
FIG. 7 is a schematic block diagram of a communications apparatus according to an embodiment of this application.

When the communications apparatus is a terminal, FIG. 7 is a simplified schematic structural diagram of the terminal. For ease of understanding and figure illustration, an example in which the terminal is a mobile phone is used in FIG. 7. As shown in FIG. 7, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to receive data entered by a user and output data to the user. It should be noted that terminals of some types might not have the input/output apparatus.

When needing to send data, after performing baseband processing on the data to be sent, the processor outputs a baseband signal to the radio frequency circuit. The radio frequency circuit performs radio frequency processing on the baseband signal and sends a radio frequency signal out in a form of an electromagnetic wave by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 7 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit having transmission and receiving functions may be considered as a transceiver unit of the terminal, and the processor having a processing function may be considered as a processing unit of the terminal. As shown in FIG. 7, the terminal includes a transceiver unit 1110 and a processing unit 1120. The transceiver unit may also be referred to as a transceiver machine, a transceiver, a transceiver apparatus, or the like. The processing unit may also be referred to as a processor, a processing board, a processing module, a processing apparatus, or the like. Optionally, a component for implementing a receiving function in the transceiver unit 1110 may be considered as a receiving unit, and a component for implementing a sending function in the transceiver unit 1110 may be considered as a sending unit. That is, the transceiver unit 1110 includes a receiving unit and a sending unit. The transceiver unit may also be referred to as a transceiver machine, a transceiver, a transceiver circuit, or the like sometimes. The receiving unit may also be referred to as a receiver machine, a receiver, a receiver circuit, or the like sometimes. The sending unit may also be referred to as a transmitter machine, a transmitter, a transmitter circuit, or the like sometimes.

It should be understood that, the transceiver unit 1110 is configured to perform a sending operation and a receiving operation that are on a terminal side in the foregoing method embodiment, and the processing unit 1120 is configured to perform other operations that are on the terminal in the foregoing method embodiment and that are different from the sending operation and the receiving operation.

For example, in an implementation, the transceiver unit 1110 is configured to perform the receiving operation on the terminal side in the foregoing embodiment, and/or the transceiver unit 1110 is further configured to perform other sending and receiving steps on the terminal side in the foregoing embodiment of this application. The processing unit 1120 is configured to perform other processing steps on the terminal side in the foregoing embodiment.

When the communications apparatus is a chip, the chip includes a transceiver unit and a processing unit. The transceiver unit may be an input/output circuit or a communications interface. The processing unit is a processor, a microprocessor, or an integrated circuit integrated on the chip.

Figure 8:
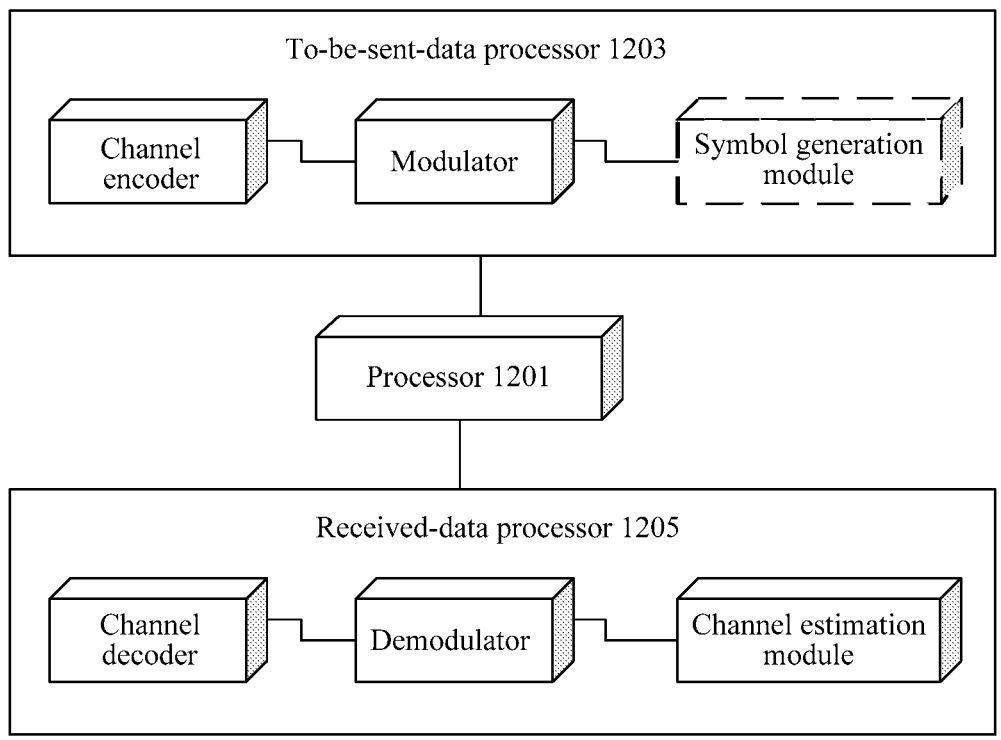
FIG. 8 is another schematic block diagram of a communications apparatus according to an embodiment of this application.

When the communications apparatus in this embodiment is a terminal, refer to a device shown in FIG. 8. In an example, the device can complete a function similar to that of the processor of the foregoing terminal. In FIG. 8, the device includes a processor 1201, a to-be-sent-data processor 1203, and a received-data processor 1205. The receiving unit 11 or the receiving module 31 in the foregoing embodiment may be the received-data processor 1205 in FIG. 8, and the sending unit in the foregoing embodiment may be the to-be-sent-data processor 1203 in FIG. 8. Although FIG. 8 shows a channel encoder and a channel decoder, but it may be understood that these modules do not constitute a limit to this embodiment, and are merely schematic.

Figure 9:
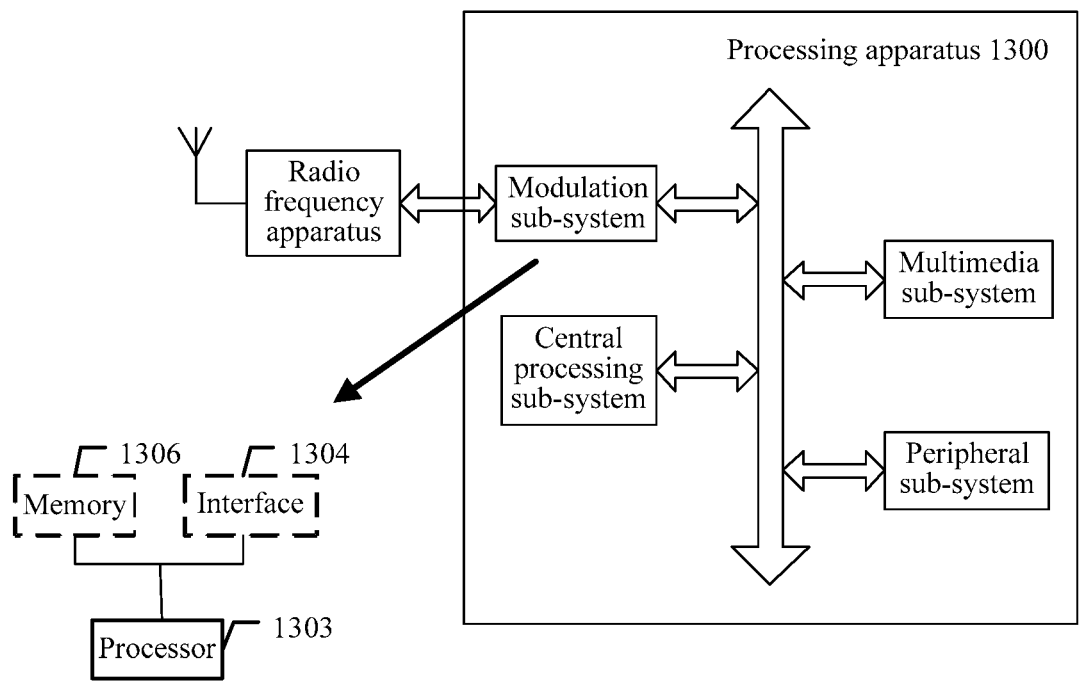
FIG. 9 is still another schematic block diagram of a communications apparatus according to an embodiment of this application.

FIG. 9 shows another form of this embodiment. A processing apparatus 1300 includes modules such as a modulation sub-system, a central processing sub-system, and a peripheral sub-system. The communications apparatus in this embodiment may be used as the modulation sub-system. Specifically, the modulation sub-system may include a processor 1303 and an interface 1304. The processor 1303 completes functions of the processing unit 12 or the processing unit 32, and the interface 1304 completes functions of the receiving unit and the sending unit of the foregoing terminal. In another variant, the modulation sub-system includes a memory 1306, a processor 1303, and a program that is stored in the memory 1306 and that can be run on the processor. When executing the program, the processor 1303 implements the method on the terminal side in the foregoing method embodiment. It should be noted that, the memory 1306 may be non-volatile or volatile, and may be located inside the modulation sub-system or inside the processing apparatus 1300, provided that the memory 1306 can be connected to the processor 1303.

In another form of this embodiment, a computer-readable storage medium is provided. The computer-readable storage medium stores an instruction, and when being executed, the instruction is used to perform the method on the terminal side in the foregoing method embodiment.

In another form of this embodiment, a computer program product including an instruction is provided. When being executed, the instruction is used to perform the method on the terminal side in the foregoing method embodiment.

An embodiment of this application further provides a communications apparatus. The communications apparatus may be a network device or a circuit. The communications apparatus may be configured to perform actions performed by the base station in the foregoing method embodiment.

Figure 10:
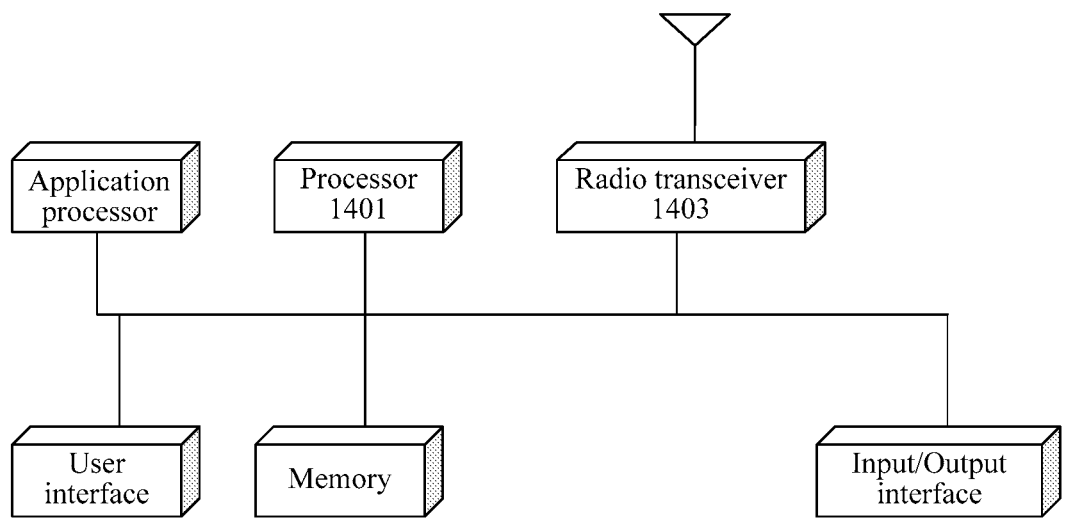
FIG. 10 is still another schematic block diagram of a communications apparatus according to an embodiment of this application.

When the communications apparatus in this embodiment is a network device, refer to a device shown in FIG. 10. The device includes a processor 1401, an application processor, a memory, a user interface, and some other components (including devices such as a power supply that is not shown). In FIG. 10, a processing unit of the foregoing network device may be the processor 1401, and completes a corresponding function. A sending module and/or a receiving module of the network device may be a radio transceiver 1403 in the figure, and complete a corresponding function by using an antenna. It may be understood that, the components shown in the figure are merely schematic, and are not necessary components to complete this embodiment.

Figure 11:
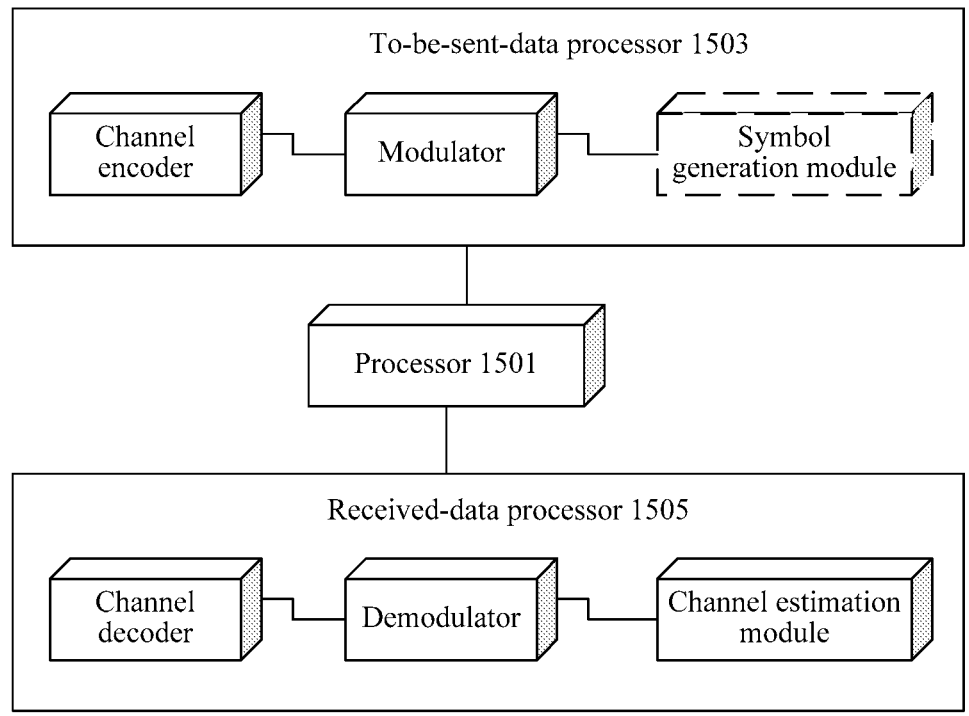
FIG. 11 is still another schematic block diagram of a communications apparatus according to an embodiment of this application.

When the communications apparatus in this embodiment is a network device, refer to a device shown in FIG. 11. In an example, the device can complete a function similar to that of the processor in FIG. 10. In FIG. 11, the device includes a processor 1501, a to-be-sent-data processor 1503, and a received-data processor 1505. In FIG. 11, a processing unit of the foregoing network device may be the processor 1501, and completes a corresponding function. A sending module 22 of the network device may be the to-be-sent-data processor 1503 in FIG. 15, and the receiving module may be the received-data processor 1505 in FIG. 11. Although FIG. 11 shows a channel encoder and a channel decoder, but it may be understood that these modules do not constitute a limit to this embodiment, and are merely schematic.

Figure 12:
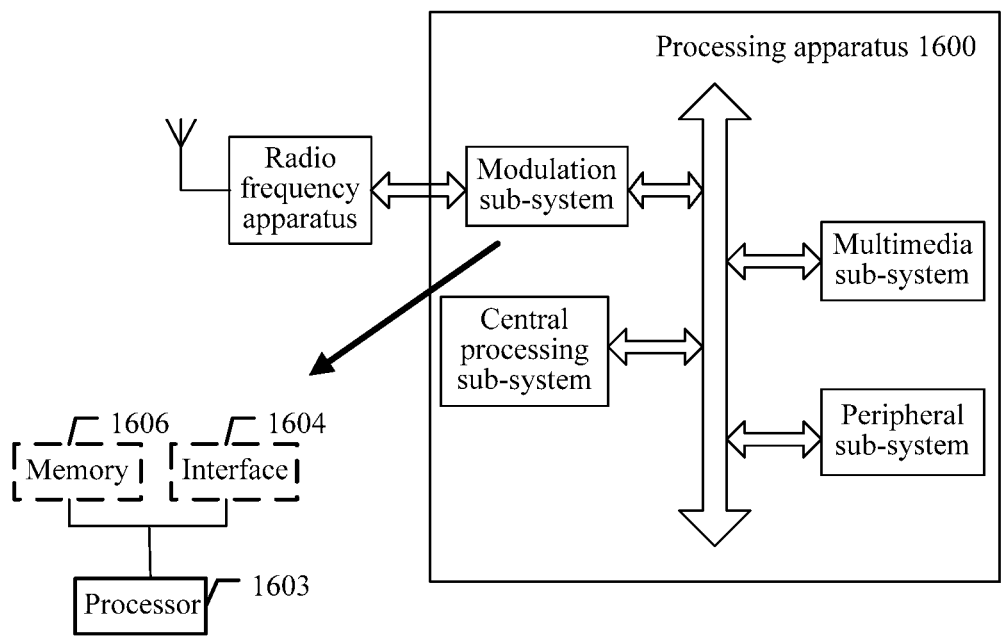
FIG. 12 is still another schematic block diagram of a communications apparatus according to an embodiment of this application.

FIG. 12 shows another form of this embodiment. A processing apparatus 1600 includes modules such as a modulation sub-system, a central processing sub-system, and a peripheral sub-system. The communications apparatus in this embodiment may be used as the modulation sub-system. Specifically, the modulation sub-system may include a processor 1603 and an interface 1604. The processor 1603 completes functions of the processing unit of the network device, and the interface 1604 completes functions of the sending module and/or the receiving module of the network device. In another variant, the modulation sub-system includes a memory 1606, a processor 1603, and a program that is stored in the memory and that can be run on the processor. When executing the program, the processor implements any method in the foregoing method embodiment. It should be noted that, the memory 1606 may be non-volatile or volatile, and may be located inside the modulation sub-system or inside the processing apparatus 1600, provided that the memory 1606 can be connected to the processor 1603.

In another form of this embodiment, a computer-readable storage medium is provided. The computer-readable storage medium stores an instruction, and when being executed, the instruction is used to perform the method on the network device side in the foregoing method embodiment.

In another form of this embodiment, a computer program product including an instruction is provided. When being executed, the instruction is used to perform the method on the network device side in the foregoing method embodiment.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, and microwave, or the like) manner. The computer-readable storage medium may be any usable medium accessible by a computer, or a data storage device, such as a server or a data center, integrating one or more usable media. The usable medium may be a magnetic medium (e.g., a soft disk, a hard disk, or a magnetic tape), an optical medium (e.g., a DVD), a semiconductor medium (e.g., a solid-state drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, carried out by a terminal device, for handling a radio link failure (RLF), the method comprising:
   sending duplicated data packets to a network device on a first carrier and a second carrier over a radio interface between the terminal device and the network device, wherein the first carrier is a secondary component carrier, and wherein the first carrier and the second carrier are aggregated carriers; and
   sending an RLF indication information to the network device in accordance with a determination that an RLF event occurred on the first carrier, wherein the RLF indication information indicates that the RLF event occurred,
   wherein the RLF indication information comprises a first indication information corresponding to the first carrier on which the RLF event occurred, and
   wherein the first carrier is used to send a data packet from a first logical channel.

2. The method according to claim 1, wherein the RLF event comprises a quantity of retransmissions of radio link control (RLC) layer data packets reaching a maximum RLC layer packet retransmission quantity.

3. The method according to claim 1, wherein the method further comprises:
   receiving a media access control (MAC) control element (CE); and
   initiating, based on the MAC CE, deactivating a duplication transmission functionality in the terminal device.

4. The method according to claim 1, wherein the method further comprises:
   transmitting data via one of logical channels in accordance with deactivating a duplication transmission functionality associated with the sending duplicated data packets to the network device on the first carrier and the second carrier.

5. The method according to claim 4, wherein the method further comprises:
   ignoring a configured binding-based transmission relationship after deactivating the duplication transmission functionality,
   wherein the configured binding-based transmission relationship is a relationship configured by a network device and indicates that data on a logical channel is to be transmitted on one or more carriers.

6. A terminal device, wherein the terminal device comprises:
   a transceiver;
   a processor; and
   a non-transitory computer-readable medium including computer-executable instructions that, when executed by the processor, facilitate the terminal device carrying out a method including:
   sending, by the transceiver cooperatively operating with the processor, duplicated data packets to a network device on a first carrier and a second carrier over a radio interface between the terminal device and the network device, wherein the first carrier is a secondary component carrier, and wherein the first carrier and the second carrier are aggregated carriers; and
   sending, by the transceiver cooperatively operating with the processor, an RLF indication information to the network device in accordance with a determination that the RLF event occurred on the first carrier, wherein the RLF indication information indicates that the RLF event occurred,
   wherein the RLF indication information comprises a first indication information corresponding to the first carrier on which the RLF event occurred, and
   wherein the first carrier is used to send a data packet from a first logical channel.

7. The terminal device according to claim 6, wherein the RLF event comprises a quantity of retransmissions of radio link control (RLC) layer data packets reaching a maximum RLC layer packet retransmission quantity.

8. The terminal device according to claim 6, wherein the method further comprises:
   receiving, by the transceiver cooperatively operating with the processor, a media access control (MAC) element (CE);
   initiating, by the processor and based on the MAC CE, deactivating a duplication transmission functionality in the terminal device.

9. The terminal device according to claim 6, wherein the method further comprises:
   transmitting, by the transceiver cooperatively operating with the processor, transmitting data via one of logical channels in accordance with deactivating a duplication transmission functionality associated with the sending duplicated data packets to the network device on the first carrier and the second carrier.

10. The terminal device according to claim 9, wherein the method further comprises:
    ignoring, by the processor, a configured binding-based transmission relationship after deactivating the duplication transmission functionality,
    wherein the configured binding-based transmission relationship is a relationship configured by a network device and indicates that data on a logical channel is to be transmitted on one or more carriers.

11. A network device, wherein the network device comprises:
    a transceiver;
    a processor; and
    a non-transitory computer-readable medium including computer-executable instructions that, when executed by the processor, facilitate carrying out a method including:
    receiving, on a first carrier and a second carrier, duplicated data packets sent by a terminal device over a radio interface between the terminal device and the network device, wherein the first carrier is a secondary component carrier, and wherein the first carrier and the second carrier are aggregated carriers;

receiving a radio link failure (RLF) indication information sent by the terminal device, wherein the RLF indication information indicates that an RLF event occurred on the first carrier; and determining, based on the RLF indication information, a carrier that is in the first carrier on which the RLF event occurred, wherein the RLF indication information comprises a first indication information corresponding to the first carrier on which the RLF event occurred, and wherein the first carrier is used to send a data packet from a first logical channel.

12. The network device according to claim 11, wherein the RLF event comprises a quantity of retransmissions of radio link control (RLC) layer data packets reaching a maximum RLC layer packet retransmission quantity.

* * * * *